United States Patent Office.

JOHN CARNRICK, OF NEW YORK, N. Y.

MEDICINAL EMULSION.

SPECIFICATION forming part of Letters Patent No. 327,232, dated September 29, 1885.

Application filed February 4, 1885. (No specimens.) Patented in England May 1, 1884, No. 7,110.

*To all whom it may concern:*

Be it known that I, JOHN CARNRICK, of New York, in the county of New York and State of New York, have invented certain new and useful Improvements in Nutritive and Medicinal Emulsions or Compositions; and I do hereby declare that the following is a full, clear, and exact description of the invention, which will enable others skilled in the art to which it appertains to make and use the same.

This invention relates to nutritive or medicinal compositions or emulsions; and its object is to provide an emulsion which is agreeable in appearance and taste, and possessed of highly nutritive and invigorating qualities, and suitable for use in cases of debility, and in all cases in which a physician would properly prescribe a readily-digestible and assimilable nutritive.

The essential ingredients of my improved emulsion or composition of matter are cod-liver oil, milk, and pepsin, to which, when desired, may be added gum-arabic or an equivalent mucilaginous substance to assist in preserving the union of the oil and milk in the permanent form of an emulsion. The ingredients are mixed together in suitable proportions, which may vary within wide limits—as, for instance, twenty to eighty parts of the oil with eighty to twenty parts of milk by volume, and, say, one-fourth ounce of commercial pepsin to the gallon of the mingled oil and milk. The milk used in the emulsion may previously be reduced to one-half (more or less) of its volume by removing a portion of the water by evaporation. The proportions of the milk and oil which I prefer are about equal parts, by volume, of cod-liver oil and of the milk reduced by evaporation, as above. The pepsin digests in whole or in part the nitrogenized components of the milk—*i. e.*, converts them into peptones which are readily assimilated when taken as food or medicine, and therefore better suited to persons with weak or sensitive digestive organs. The thus peptonized emulsion is quite palatable, is in excellent form for digestion, and is readily assimilated. The pepsin used is preferably dissolved in glycerine previous to its mixture with the cod-liver oil and milk. The glycerine assists in maintaining the union of the oil and milk, and also acts as a preservative.

In preparing the emulsion I mix together, preferably, about equal quantities of cod-liver oil and of the milk reduced by evaporation, and add the requisite proportion of pepsin (and when desired, say, sixteen ounces of gum-arabic or equivalent mucilaginous substance to the gallon.) The gum serves to make the emulsion permanent, the materials being mixed in the usual manner of preparing emulsions.

The use of milk, especially concentrated milk, in the emulsions possesses important advantages over water, ordinarily used, for with milk the emulsion is more easily formed, and, besides, the milk contains all the necessary constitutents to maintain healthy nutrition, and is therefore a valuable aid to the oil as a nutritive agent.

When the gum or its equivalent is used, it assists in maintaining the permanence of the emulsion for a longer period than may ordinarily be experienced with an emulsion of the oil and peptonized milk without such assistance.

My said emulsion may be used in conjunction or at the same time with other nutritive or medicinal substances.

I am aware that emulsions of cod-liver oil with digestive ferments are not new, and that glycerine and hypophosphites have been added to such emulsions with gum as the suspending agent, such therefore I do not claim, but

What I claim as my invention is—

As a new article of manufacture, a pepsinized emulsion of cod-liver oil and milk, substantially as herein set forth.

In testimony that I claim the foregoing as my own I affix my signature in presence of two witnesses.

JOHN CARNRICK.

Witnesses:
 HENRY C. BANKS,
 JOHN B. PERRY, Jr.